United States Patent
Barajas Gonzalez et al.

(10) Patent No.: US 10,690,364 B2
(45) Date of Patent: Jun. 23, 2020

(54) PREDICTIVE ANALYTICS TO DETERMINE OPTIMAL STRUCTURE CONTROL

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

(21) Appl. No.: 14/847,206

(22) Filed: Sep. 8, 2015

(65) Prior Publication Data

US 2017/0067661 A1 Mar. 9, 2017

(51) Int. Cl.
| | | |
|---|---|---|
| *F24F 11/30* | (2018.01) | |
| *G05B 15/02* | (2006.01) | |
| *F24F 11/62* | (2018.01) | |
| *F24F 11/46* | (2018.01) | |
| *F24F 130/10* | (2018.01) | |
| *F24F 120/10* | (2018.01) | |
| *F24F 130/00* | (2018.01) | |

(52) U.S. Cl.
CPC ............ *F24F 11/30* (2018.01); *F24F 11/62* (2018.01); *G05B 15/02* (2013.01); *F24F 11/46* (2018.01); *F24F 2120/10* (2018.01); *F24F 2130/00* (2018.01); *F24F 2130/10* (2018.01); *G05B 2219/2642* (2013.01)

(58) Field of Classification Search
CPC ............... F24F 11/006; F24F 11/0034; F24F 2011/0058; F24F 2011/0075; G05B 15/02; G05B 2219/2642
USPC ........................................................ 700/276
See application file for complete search history.

(56) References Cited

U.S. PATENT DOCUMENTS

| | | | |
|---|---|---|---|
| 8,751,432 B2 | 6/2014 | Berg-Sonne et al. | |
| 2011/0213588 A1* | 9/2011 | Lin ...................... | G05B 13/048 702/181 |
| 2011/0264278 A1* | 10/2011 | Gilbert ............... | G05D 23/1904 700/277 |
| 2012/0310376 A1* | 12/2012 | Krumm .................. | G05B 15/02 700/31 |
| 2013/0190940 A1* | 7/2013 | Sloop .................... | G05B 15/02 700/291 |

(Continued)

OTHER PUBLICATIONS

Jain et al., "Forecasting energy consumption of multi-family residential buildings using support vector regression: Investigating the impact of temporal and spatial monitoring granularity on performance accuracy", Jun. 15, 2014, pp. 168-178, Applied Energy, vol. 123.

(Continued)

*Primary Examiner* — Jigneshkumar C Patel
(74) *Attorney, Agent, or Firm* — Griffiths & Seaton PLLC

(57) ABSTRACT

Embodiments for facility management by a processor. Operations are performed to collect and track environmentally-related data of the facility over time. Predictive analytics are applied to the environmentally-related data to generate decisions that are dynamically applied to environmental settings of the facility.

18 Claims, 3 Drawing Sheets

(56) References Cited

U.S. PATENT DOCUMENTS

| | | | |
|---|---|---|---|
| 2013/0231792 A1* | 9/2013 | Ji | G05B 19/02 |
| | | | 700/291 |
| 2014/0316582 A1* | 10/2014 | Berg-Sonne | G05B 15/02 |
| | | | 700/276 |
| 2014/0365182 A1 | 12/2014 | Marceau et al. | |
| 2015/0378381 A1* | 12/2015 | Tinnakornsrisuphap | |
| | | | G05F 1/66 |
| | | | 700/276 |
| 2016/0161136 A1* | 6/2016 | Macek | F24F 11/006 |
| | | | 700/276 |
| 2016/0321750 A1* | 11/2016 | He | G06Q 40/04 |

OTHER PUBLICATIONS

Moon et al., "Application of control logic for optimum indoor thermal environment in buildings with double skin envelope systems" pp. 59-71, Energy and Buildings, vol. 85, Dec. 2014.

\* cited by examiner

PREDICTIVE ANALYTICS TO DETERMINE OPTIMAL STRUCTURE CONTROL

BACKGROUND OF THE INVENTION

Field of the Invention

The present invention relates in general computing systems, and more particularly to, various embodiments for facilities management.

Description of the Related Art

Today, with the increase in complexity of electrical components and interconnected systems in physical environments, a corresponding increase in energy demand has taken place. Commensurate with this increase in energy use has also come an increased desire for energy conservation.

SUMMARY OF THE INVENTION

Various embodiments for facility management by a processor are provided. In one embodiment, by way of example only, a method for facility management by a processor is provided. Operations are performed to collect and track environmentally-related data of the facility over time. Predictive analytics are applied to the environmentally-related data to generate decisions that are dynamically applied to environmental settings of the facility.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
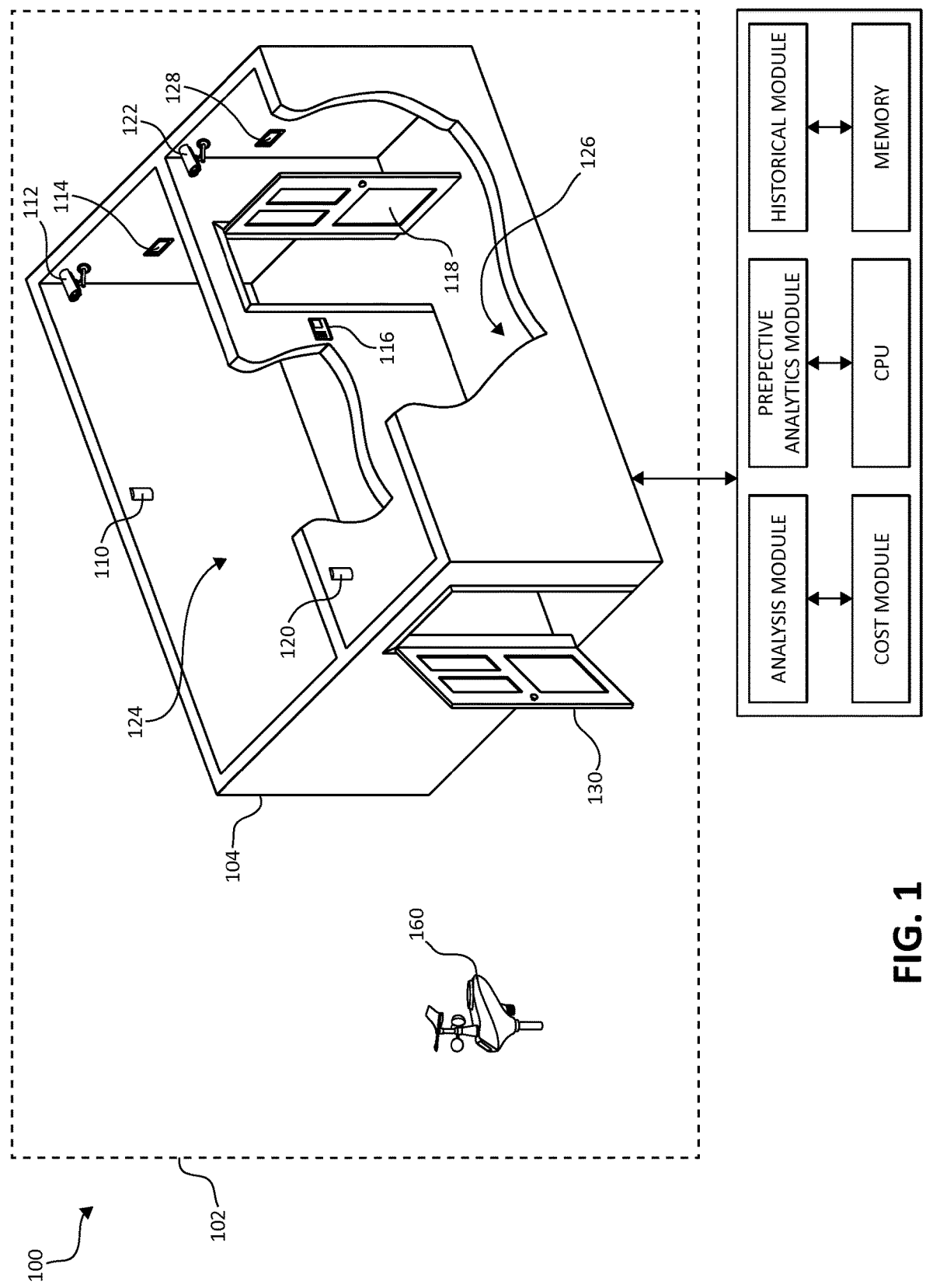
FIG. 1 is an illustration of a portion of a monitored physical facility, in communication with various data input, data processing and computing components, in which various aspects of the present invention may be realized.

In modern day structures, it is not uncommon to have, for example, large influxes of persons arrive at a particular time, or within a short period of time, among other sudden physical changes to the structure's environment. These physical changes might involve such events as weddings, meetings, conferences, and so forth. At the same time, it is also not uncommon for these same physical structures to sit unoccupied for a long period of time (e.g., between conferences, meetings, and so forth).

In these kinds of structures with great variation in physical circumstances, the typical facilities management technique usually involves a management personnel (hopefully) properly attending to heating, cooling, lighting control, ventilation, and other environmental settings.

Consider the following example. A particular facility may have a wedding set for 3:00 P.M. on a certain day. At 8:00 on the wedding event, the facility may be empty, warm (or hot), and the lights and other electrical functionality turned off. It is generally the responsibility of the facilities personnel to see to it that special accommodations are made in advance to prepare the environmental settings to accommodate the wedding event. In some cases, the decision to begin cooling the facility may be taken too late; in which case hundreds of uncomfortable people await the climate control system to catch up, if the system is even able to catch up with the instant cooling requirements.

The more complicated that physical facilities become in terms of climate control, lighting, electrical requirements, and so forth, the greater user intervention becomes necessary to ensure that each of these potentially complex systems are brought to bear in the right way, at the right time, such that the facility effectively accommodates the requirements placed on it at a particular time. Moreover, in the cases such as the aforementioned wedding example where the system is catching up to environmental loads placed upon it, energy consumption is needlessly increased. For example, the greatest electrical load to cool the building for the afternoon wedding may be placed at exactly the wrong time window (e.g., when the cost of electricity is the highest).

In view of the foregoing, a need exists for a mechanism for effective facilities management, such that various scenarios are taken into account well in advance of a particular event, thus providing greater utility to customers and lowering energy consumption at the same time. In addition, such a mechanism should include functionality for real-time change, should a particular physical environment demand such change.

The mechanisms of the illustrated embodiments provide various functionality for bringing to bear predictive analytics upon facilities management decisions, such that the physical facilities are made increasingly more comfortable while maximizing cost-effectiveness, as will be further described. In addition, the mechanisms lessen the burden placed upon individual facilities personnel to personally monitor an increasing labyrinth of settings, controls, temperatures, costs, and other factors.

Accordingly, the present invention provides various embodiments for, among other aspects, providing predictive analytics as it applies to facility energy management and environmental controls. Utilizing these aspects, facility management personnel are able to both save energy while greatly increasing occupant comfort by anticipating, among other factors, environmental needs such as heating, cooling, lighting, and the like.

The present invention provides aspects that anticipate and calculate the needed resource usage to allow for the physical facility to be prepared for occupants in a manner that is efficient, while enhancing comfort. Encompassing a wide scope of facility energy usage methods, while also tracking the arrival and planned arrival of known future occupants, the mechanisms of the illustrated embodiments, following, provide the ability for the environmental controls to work proactively instead of reactively with regard to a particular environmental scenario.

As will be further described, the mechanisms of the illustrated embodiments involve a data collection aspect, and an analytics aspect. As a preliminary matter, various data (both historical, current, and predicted) is gathered, organized, and analyzed. This data may be obtained from a variety of sources as will be described, such as environmental sensors, calendars, entry tracking mechanisms, cameras, thermometers, databases, forecasts, historical data, and the like.

As one of ordinary skill in the art will appreciate, the greater the totality of the environmental data collected about a particular facility and an upcoming event, the better the ability of a particular management system to accurately predict appropriate environmental settings at a particular time, also keeping in mind the costs involved for such settings so as to minimize resource consumption.

Once the environmental data is collected and analyzed, the predictive analytics may then be applied to particular events. In addition, as the events unfold in real-time, various monitoring functionality may ensure that settings are updated to reflect real-time changes in demand. For example, if a particular wedding is slated to have 300 attendees, but yet only 150 attendees actually arrive, the mechanisms of the present invention may then adjust various physical settings so as to save resources and maximize comfort (e.g., not overcool the building, etc.) Various aspects of the aforementioned functionality will be further explained, following.

Turning now to the Figures, FIG. 1 is a block diagram of a portion 102 of a physical facility 100 in which aspects of the present invention may be implemented. The portion 102 includes physical structure 104, here shown as two rooms 124 and 126. Physical facility 100 has been equipped with a variety of sensors, cameras, entry monitoring devices, thermometers, and other data collection devices for the physical environment as will be further described.

While one of ordinary skill in the art will appreciate that other data collection devices may be installed and located in various locations in rooms 124, 126, or elsewhere, the various data collection devices shown in physical facility 100 include sensors 110 and 120, closed circuit television (CCTV) cameras 112 and 122, and thermometers 114 and 128. Entry 118 (e.g., door) is monitored by badge access device 116. In one embodiment, when employees enter the room 124, their employment badges are scanned by device 116. In addition, an outdoor weather station 160 provides weather information, such as barometric pressure, rainfall, windspeed and direction, and temperature.

As one of ordinary skill in the art will appreciate, the various sensors 110 and 120 may include a variety of monitoring devices that may monitor physical characteristics of the rooms 124 and 126. For example, the sensors 110 and 120 may include motion sensors that monitor movement in the rooms 124 and 126. In other implementations the sensors 110 and 120 may incorporate other cameras (e.g., infrared or ultraviolet), or a humidity sensor. The sensors 110 and 120, ultimately, can vary in a variety of implementations such that a wide variety of data representative of the interior physical environment of rooms 124 and 126.

In one embodiment, for example, the sensor devices 110, 120 may include such devices as a motion sensor, a specialized visible camera (with or without flash enhancement), an infrared camera, and a light meter. The various sensor devices may act individually, or in concert to obtain status information of the facility 100 and/or any change information concerning the facility 100. As one of ordinary skill in the art will appreciate, the sensors may be configured for differing functionality. For example, the visible camera may obtain visible images of the facility 100, occupants (not shown), or other visibly obtained information. The infrared camera may obtain infrared images of objects in the vicinity of the camera. The motion sensor may detect movement that occurs in the facility 100 (such as, for example, movement of an occupant throughout the facility 100).

As one of ordinary skill in the art, the various sensors shown herein are representative of other sensors that may be employed in the environment 100. These sensors may also include such devices as radio frequency identification (RFID) devices, closed-circuit television (CCTV), bar code scanners/readers, auditory detectors (e.g., microphones), global positioning system (GPS) devices, and other similar devices. To wit, an exemplary CCTV device is depicted as devices 112 and 122. The CCTV devices 112, 122 may assist the sensors 110 or badge access device 116 to gauge an accurate determination of a current occupancy of the rooms 124 and 126.

Each of the data collection devices 110, 112, 114, 116, 120, 122, 128, and 160 is connected to analysis and control computer 106 via communications link 108 as shown. Here, as the partial illustration of facility 100 is shown, various electrical, communications, data storage, processing, and similar components may be inclusive of computer 106. However, for the sake of illustrative convenience, and as one of ordinary skill in the art will appreciate, some exemplary representative components are illustrated, and other components are contemplated (hardware and software) according to a particular implementation.

In analysis and control computer 106 as shown, an analysis module 132, cost module 134, predictive analytics module 136, central processing unit (CPU) 138, historical module 140, and memory 142 are depicted. Each of the depicted modules 132, 134, 136, 140, and those not shown, may work collectively, or individually, to accomplish various aspects of the present invention.

In one embodiment, the analysis module 132 analyzes incoming data from the various data collection devices described previously. The analysis module 132 may, for example, determine what kind of data is being input into the computer 106 (e.g., whether temperature, motion detection, CCTV, and so forth). The analysis module 132 may also determine whether the data is current. The analysis module 132 may forward certain types of data to other modules 134, 136, or 140. If, for example, the analysis module 132 determines that historical data (e.g., historical temperatures) are being input into the computer 106, the analysis module 132 forwards the historical data to the historical module 140.

In similar fashion to the analysis module 132, the historical module 140 may be configured for certain kinds of data processing operations. The historical module 140 may include various databases of information that incorporate, for example, historical and average temperature readings over a certain period of time, record high and low temperatures, historical storm information, historical humidity information, and similar historical environmental data.

The cost module 134 may store and retrieve energy cost information. For example, the cost module 134 may determine that a certain times of a certain day, the cost pricing for a certain amount of energy is in a certain tier of pricing. The cost module 134 may retain energy cost information for electricity, gas, water, and other resource cost information.

CPU 138 and/or memory 142 may perform various data organization, processing, and management operations according to one of ordinary skill in the art. Data may be temporarily stored in memory 142, or other locations. Data may be permanently stored in memory 142, or in other locations. CPU 138 may perform calculations involving environmental measurements, historical data, energy costs, and the like. CPU 138 may also generate and communicate environmental control decisions to various portions of the facility (such as the thermostats 114 and 128).

The historical module 140, in combination with the analysis module 132, the cost module 134, or other modules may provide various data to the predictive analytics module 136 to perform predictive analytics operations on the data and generate environmental control decisions as will be further described. Each of the following functionality may be attributable to operations performed by the predictive analytics module 134, the historical module 140, cost module 134, analysis module 132, or other modules not illustrated.

In one embodiment, the computer 106 and various components therein may initialize one or more calendars, with attendant entries, which track room allocations for various occupants at a particular date and time. For example, a meeting to occur in room 124 may have an attendant calendar entry with a number of accepted invitations by various personnel. The calendar entry may be maintained and tracked by computer 106, taking into account remotely located employees who are not registered, for example, as traveling within the calendar system.

In another embodiment, the computer 106, predictive analytics module 134, and/or other modules may measure an average building occupancy by way of badge access 116, CCTV 112, 122, or other data input mechanism capable of counting individuals entering the rooms 124 and/or 126. The various components of computer 106 may track calendar entries that involve employees being away from work or otherwise not in their offices. The various components may record and track local weather conditions through weather station 160. The various components may monitor a cost of energy at the given time of the day. The energy cost monitoring may include time of use metering, and for large enough facilities 100, a spot market pricing model for a particular energy. Finally, the various components may retain a historical building usage (occupancy, hours of operation, etc.) and a preferred temperature.

The predictive analytics module 134 may bring to bear predictive analytics operations in a variety of scenarios. Some exemplary scenarios are further described, following. Consider a first example. The predictive analytics module 134 may apply analytics to take into account a total expected occupancy for every room in the facility 100 throughout the day. Once this information is captured, the preferred temperature of the room (e.g., set by the occupants) is taken into account, and analytics are performed specifically with the intention of determining a necessary starting temperature and energy usage to maintain the preferred temperature.

In an additional example, the predictive analytics module 134 may apply analytics to predict system utilization based on past trends of similar occupancy, outside environments, and building population considerations in order to ensure that proper pre-cooling and pre-heating is performed to prepare the facility for the expected energy load(s).

Consider the following additional example. In many parts of the world, energy costs may vary by time of use, and by an amount of usage; usually the varying cost structure is organized in tiers. By retaining accurate consumption information, adjustments may be made to the facilities environment to either utilize lower cost energy (by, for example making literal tons of ice during the night to be able to assist with the chilled water plant during the day's maximum load), or to prevent energy usage from going into the next cost tier. If the facility is being asked to be cooled to a certain temperature, but the analytics operations performed predict that doing so would cause the building to reach a higher cost tier of electricity, for example, the mechanisms of the illustrated embodiments may delay the cooling (e.g., a couple of degrees) until the subsequent time of use window has arrived, given the assumption that the window is close enough.

Weather forecast information may be used to assist with predictive energy consumption as it applies to heating and cooling the facility. In a further example, the facility may be permitted to obtain a colder nighttime temperature for expected higher temperatures the following day.

The predictive analytics operations performed may, for example, estimate an expected number of attendees by considering the attendance rate of an event itself (in the case, for example, the event has been presented in the same and/or other locations in the past) as well as the attendance rates of the people that are appointed for the event. If, for example, the guest list contains 300 persons, but the event is a wedding event that typically sees an 85% occupancy rate, then the climate of the facility may be predicted to be initially prepared for 255 persons. This value can then be adjusted in real time as people arrives and are detected by data collection devices in the facility itself.

Figure 2:
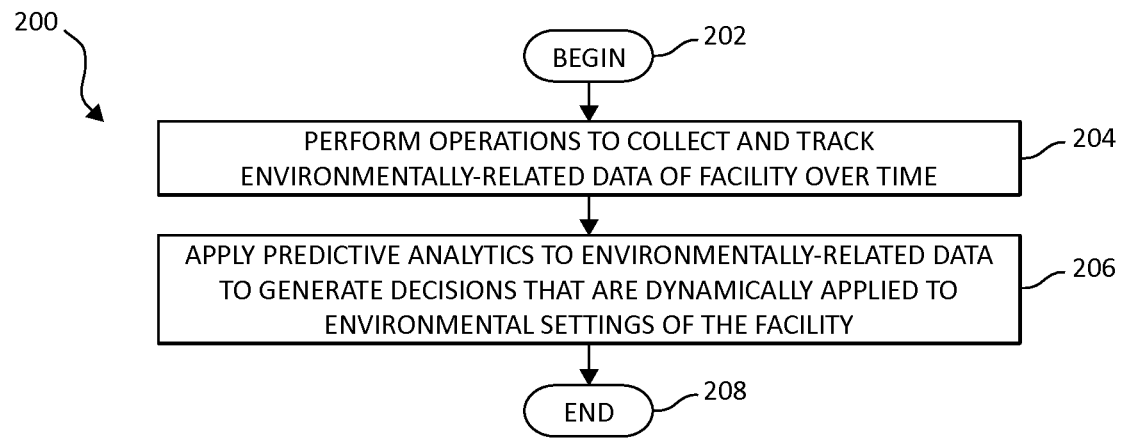
FIG. 2 is a flow chart diagram of an exemplary method for facility management, in which aspects of the present invention may be realized.
Figure 3:
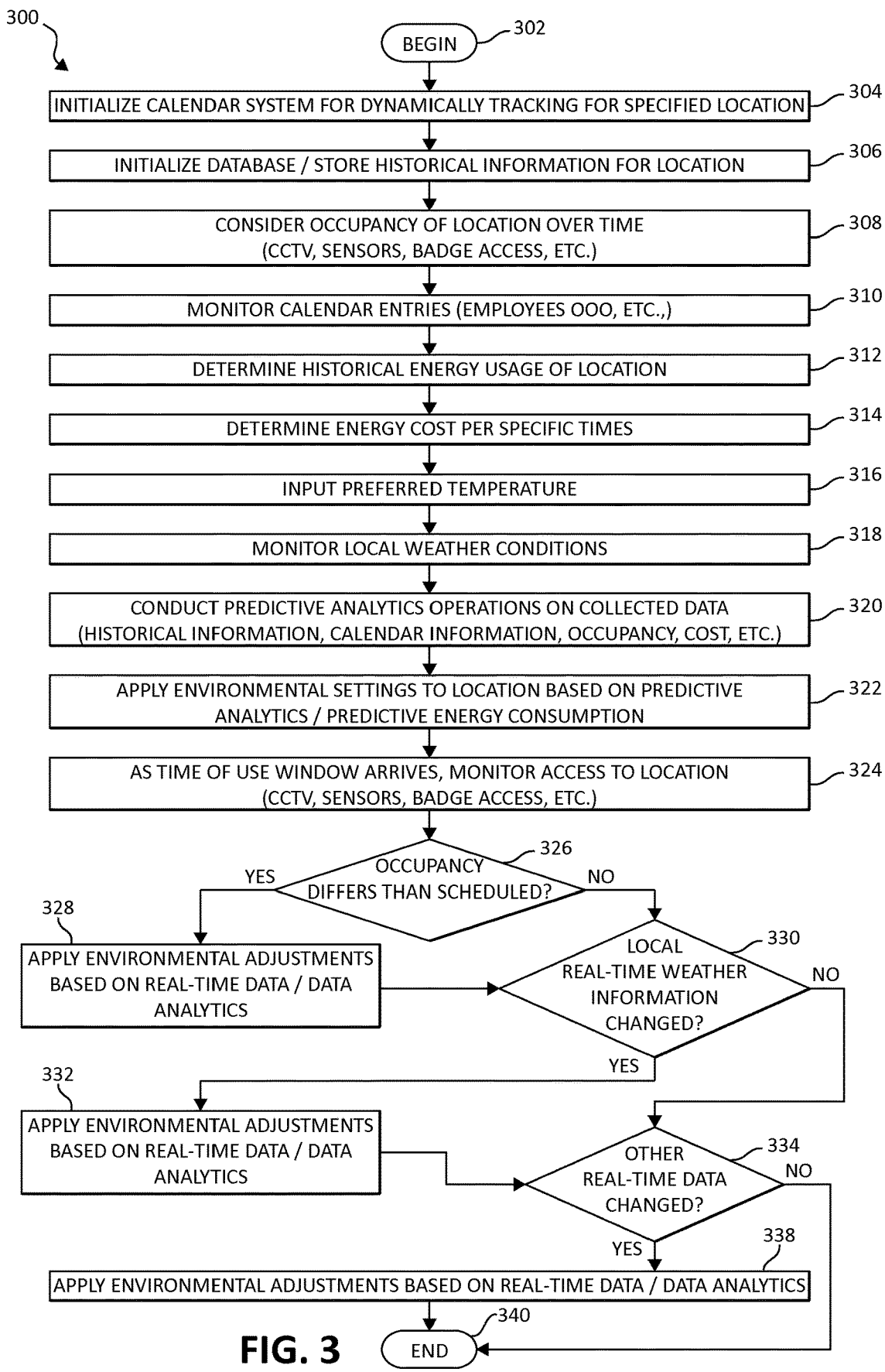
FIG. 3 is a flow chart diagram of an additional exemplary method for facility management, again in which various aspects of the present invention may be implemented.

In consideration of the foregoing, FIG. 2, following, illustrates an exemplary method 200 for performing facilities management by a processor, in which various aspects of the illustrated embodiments may be implemented. Method 200 begins (step 202) with the performance of various operations to collect and track environmentally-related data of the particular facility over time (step 204).

In a following step, predictive analytics are applied to the environmentally-related data to generate decisions that are dynamically applied to environmental settings of the facility (step 206). The method 200 then ends (step 208).

The method 200 illustrated in FIG. 2 is supplanted by an additional exemplary method 300 for facilities management, in which various aspects of the present invention may be implemented. Method 300 begins (step 302) with the initialization of a calendar system for dynamically tracking occupancy (and other environmentally-related factors) for a specified location (step 304).

In a following step, one or more databases are initialized to store historical information for the specified location (step 306). Various historical information is considered, such as the occupancy of the location relying on CCTV, sensors, badge access and the like (step 308). In one example, as previously mentioned, the occupancy information for the location may be analyzed against previous similar events (such as a similar meeting at that particular location or another location).

Calendar entries are also monitored up until the time window of the event to determine an instant occupancy, giving consideration to out-of-office (OOO) messages, declined invitations, and other related data (step 310). The historical energy use for the location is analyzed (step 312), as well as a determination of energy cost(s) per specific times (also, for example, giving consideration to potential cost tiers or other cost data) (step 314). A preferred temperature is also input (step 316), and local weather conditions (e.g., wind, forecast information, temperature, humidity, barometric pressure, and other information) is also input (step 318).

Based on the foregoing inputted data, a number of predictive analytics operations is performed on the data (e.g., historical information, calendar information, occupancy, cost, etc.) in a similar manner to the examples previously described (step 320). Based on the predictive analytics, various environmental settings are applied to the location to provide predictive energy consumption according to the analytics operations (step 322). These environmental settings may include such functionality as deciding whether to cool to what temperature at what time, lights and airflow settings, alarm settings, electronics (networking, wireless, and other communications) settings, and the like.

As the time of use window arrives, the various sensors monitor access to the location, as well as occupancy at the instant time(s) (step 324). In addition, the various sensors monitor local weather conditions, the calendar entries, energy costs, and other real-time data. If the occupancy differs from the occupancy scheduled for the location (step 326), then environmental adjustments are performed based on the real-time data/data analytics performed (step 328). These environmental adjustments may include increasing the temperature, lowering the temperature, increasing airflow, and so forth.

If, in addition (or alternatively) the local real-time weather information has changed (step 330), various environmental adjustments may be applied in a similar manner as previously to compensate (step 332). Similarly, if other real-time data has changed, (step 334), other environmental adjustments may be applied in a similar manner (step 336). The method 300 then ends (step 338).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for facility management by a processor, comprising:
performing operations to collect and track environmentally-related data of the facility over time;
applying predictive analytics to the environmentally-related data to generate decisions that are dynamically applied to environmental settings of the facility, the predictive analytics considering as input, to generate the decisions, an instant or future energy cost for the at least a portion of the facility including determining at least an electricity, gas, and water cost pricing at certain times of a day is within a certain tier of pricing such that the decisions applied to the environmental settings of the facility are given priority during the certain times of the day according to the certain tier of pricing; wherein the decisions applied to the environmental settings of the facility given priority include at least precooling or preheating the facility during the times of the day when the certain tier of pricing is in effect;
using weather forecast information to generate the decisions that are dynamically applied to the environmental settings of the facility according to the predictive analytics such that the weather forecast information is implemented to permit the facility to obtain a colder or warmer temperature during a preceding day prior to the certain times of the day of a following day than would otherwise be permitted, based on the weather forecast information of a future time period; such that wherein energy is conserved by ceasing to heat or cool the facility which would otherwise be heated or cooled during the preceding day prior to the certain times of the day of the following day according to the weather forecast information of the future time period; and
configuring a calendar system for dynamically tracking occupancy of at least the portion of the facility, wherein the occupancy over time compared to an automatically detected real-time occupancy is considered as at least a portion of the environmentally-related data to generate the decisions; and wherein historical events known to generate a certain first number of actual occupants relative to a second number of invited occupants, the historical events and certain second number of invited occupants thereof specified previously within the calendar system, are used to effect at least the portion of the decisions notwithstanding the environmental settings are adjusted in real-time according to the automatically detected real-time occupancy comprising a total number of instant occupants.

2. The method of claim 1, wherein dynamically tracking occupancy includes monitoring an access to the at least the portion of the facility.

3. The method of claim 1, further including performing at least one of:
monitoring at least one local weather condition,
determining a historical usage of the at least the portion of the facility, and
determining a preferred temperature of the at least the portion of the facility.

4. The method of claim 1, further including, previous to applying predictive analytics to the environmentally-related data, generating a total expected occupancy for each room in the facility.

5. The method of claim 1, wherein applying predictive analytics to the environmentally-related data to generate decisions that are dynamically applied to environmental settings of the facility includes performing at least one of:
considering past trends of similar occupancy for at least a portion of the facility, and
considering historical weather information.

6. The method of claim 1, wherein applying predictive analytics to the environmentally-related data to generate decisions that are dynamically applied to environmental settings of the facility further includes considering current environmentally-related data to adjust an instant one of the environmental settings.

7. A system for facility management, comprising:
a processor, wherein the processor:
performs operations to collect and track environmentally-related data of the facility over time,
applies predictive analytics to the environmentally-related data to generate decisions that are dynamically applied to environmental settings of the facility, the predictive analytics considering as input, to generate the decisions, an instant or future energy cost for the at least a portion of the facility including determining at least an electricity, gas, and water cost pricing at certain times of a day is within a certain tier of pricing such that the decisions applied to the environmental settings of the facility are given priority during the certain times of the day according to the certain tier of pricing; wherein the decisions applied to the environmental settings of the facility given priority include at least precooling or preheating the facility during the times of the day when the certain tier of pricing is in effect,
uses weather forecast information to generate the decisions that are dynamically applied to the environmental settings of the facility according to the predictive analytics such that the weather forecast information is implemented to permit the facility to obtain a colder or warmer temperature during a preceding day prior to the certain times of the day of a following day than would otherwise be permitted, based on the weather forecast information of a future time period; wherein energy is conserved by ceasing to heat or cool the facility which would otherwise be heated or cooled during the preceding day prior to the certain times of the day of the following day according to the weather forecast information of the future time period, and
configures a calendar system for dynamically tracking occupancy of at least the portion of the facility, wherein the occupancy over time compared to an automatically detected real-time occupancy is considered as at least a portion of the environmentally-related data to generate the decisions; and wherein historical events known to generate a first number of actual occupants relative to a second number of invited occupants, the historical events and second number of invited occupants thereof specified previously within the calendar system, are used to effect at least the portion of the decisions notwithstanding the environmental settings are adjusted in real-time according to the automatically detected real-time occupancy comprising a total number of instant occupants.

8. The system of claim 7, wherein the processor, pursuant to dynamically tracking occupancy, monitors an access to the at least the portion of the facility.

9. The system of claim 7, wherein the processor at least one of:
   monitors at least one local weather condition,
   determines a historical usage of the at least the portion of the facility, and
   determines a preferred temperature of the at least the portion of the facility.

10. The system of claim 7, wherein the processor, previous to applying predictive analytics to the environmentally-related data, generates a total expected occupancy for each room in the facility.

11. The system of claim 7, wherein the processor, pursuant to applying predictive analytics to the environmentally-related data to generate decisions that are dynamically applied to environmental settings of the facility, at least one of:
   considers past trends of similar occupancy for at least a portion of the facility, and
   considers historical weather information.

12. The system of claim 7, wherein the processor, pursuant to applying predictive analytics to the environmentally-related data to generate decisions that are dynamically applied to environmental settings of the facility, considers current environmentally-related data to adjust an instant one of the environmental settings.

13. A computer program product for facility management using a processor, the computer program product comprising a non-transitory computer-readable storage medium having computer-readable program code portions stored therein, the computer-readable program code portions comprising:
   an executable portion that performs operations to collect and track environmentally-related data of the facility over time;
   an executable portion that applies predictive analytics to the environmentally-related data to generate decisions that are dynamically applied to environmental settings of the facility, the predictive analytics considering as input, to generate the decisions, an instant or future energy cost for the at least a portion of the facility including determining at least an electricity, gas, and water cost pricing at certain times of a day is within a certain tier of pricing such that the decisions applied to the environmental settings of the facility are given priority during the certain times of the day according to the certain tier of pricing; wherein the decisions applied to the environmental settings of the facility given priority include at least precooling or preheating the facility during the times of the day when the certain tier of pricing is in effect;
   an executable portion that uses weather forecast information to generate the decisions that are dynamically applied to the environmental settings of the facility according to the predictive analytics such that the weather forecast information is implemented to permit the facility to obtain a colder or warmer temperature during a preceding day prior to the certain times of the day of a following day than would otherwise be permitted, based on the weather forecast information of a future time period; wherein energy is conserved by ceasing to heat or cool the facility which would otherwise be heated or cooled during the preceding day prior to the certain times of the day of the following day according to the weather forecast information of the future time period; and
   an executable portion that configures a calendar system for dynamically tracking occupancy of at least the portion of the facility, wherein the occupancy over time compared to an automatically detected real-time occupancy is considered as at least a portion of the environmentally-related data to generate the decisions; and wherein historical events known to generate a first number of actual occupants relative to a second number of invited occupants, the historical events and second number of invited occupants thereof specified previously within the calendar system, are used to effect at least the portion of the decisions notwithstanding the environmental settings are adjusted in real-time according to the automatically detected real-time occupancy comprising a total number of instant occupants.

14. The computer program product of claim 13, further including an executable portion that, pursuant to dynamically tracking occupancy, monitors an access to the at least the portion of the facility.

15. The computer program product of claim 13, further including an executable portion that at least one of:
   monitors at least one local weather condition,
   determines a historical usage of the at least the portion of the facility, and
   determines a preferred temperature of the at least the portion of the facility.

16. The computer program product of claim 13, further including an executable portion that, previous to applying predictive analytics to the environmentally-related data, generates a total expected occupancy for each room in the facility.

17. The computer program product of claim 13 further including an executable portion that, pursuant to applying predictive analytics to the environmentally-related data to generate decisions that are dynamically applied to environmental settings of the facility, at least one of:
   considers past trends of similar occupancy for at least a portion of the facility, and
   considers historical weather information.

18. The computer program product of claim 13, further including an executable portion that, pursuant to applying predictive analytics to the environmentally-related data to generate decisions that are dynamically applied to environmental settings of the facility, considers current environmentally-related data to adjust an instant one of the environmental settings.

* * * * *